Oct. 26, 1948.                O. H. PADDOCK ET AL                 2,452,488
                          APPARATUS FOR BENDING GLASS
                              Filed Dec. 19, 1941

Inventors
ORMOND H. PADDOCK.
JOHN P. PEARSE.

By Frank Fraser
Attorney

Patented Oct. 26, 1948

2,452,488

UNITED STATES PATENT OFFICE 2,452,488

APPARATUS FOR BENDING GLASS

Ormond H. Paddock, Rossford, and John P. Pearse, Swanton, Ohio, assignors to Libbey-Owens-Ford Glass Company, Toledo, Ohio, a corporation of Ohio Application December 19, 1941, Serial No. 423,632

11 Claims. (Cl. 49—7)

1

The present invention relates to improvements in apparatus for bending glass and more particularly for the bending of flat sheets or plates of glass to predetermined curvatures.

In bending glass sheets according to one method, the sheet is supported horizontally on top of a concave metal mold and heated while thus supported in a furnace until it softens and settles into the mold, after which the sheet is cooled to handling temperature. This procedure has not proven entirely satisfactory in the past, particularly in the making of relatively sharp or semicircular bends, due principally to the fact that a relatively greater amount of heat is concentrated upon the central portion or area of the sheet than along the sides or marginal portions thereof. This concentration of heat is caused by the lens action of a concave mold in reflecting heat transmitted through the glass sheet back toward the center line of the glass sheet. As a consequence of this ununiform heating of the sheet, the central portion thereof tends to settle into the mold first and is then followed by the side portions with the result that the contour of the finished sheet is not a continuous uniform curve. Because of this, it has sometimes been necessary to resort to mechanical working or pressing of the glass sheet to cause it to accurately conform to the mold throughout its entire area; this being especially true when making compound bends. This operation, however, is objectionable as it tends to mar or impair the surface of the glass.

It is a primary aim of this invention to provide an improved form of bending apparatus which will effect a more uniform heating of the glass sheet and, in consequence, a more uniform settling of the sheet into the mold so that it will accurately conform to the curvature thereof throughout its entire area.

Generally stated, this is accomplished by the provision of a novel type of mold having means for accelerating the heating of the opposite sides or marginal portions of the glass sheet, in conjunction with means mounted above the mold for retarding the heating of the central portion of the sheet whereby to more nearly equalize the heating of all portions of said sheet and thereby cause a more even and uniform bending thereof.

Another object of the invention is the provision of an improved type of bending mold so constructed that the surface of the glass sheet will not be marred or otherwise impaired during the bending operation and further embodying novel adjustable means for supporting the

2 glass in a position most suitable for the bending of a given size and thickness of sheet.

Other objects and advantages of the invention will become more apparent during the course of the following description, when taken in connection with the accompanying drawings.

In the drawings, wherein like numerals are employed to designate like parts throughout the same:

Figure 1:
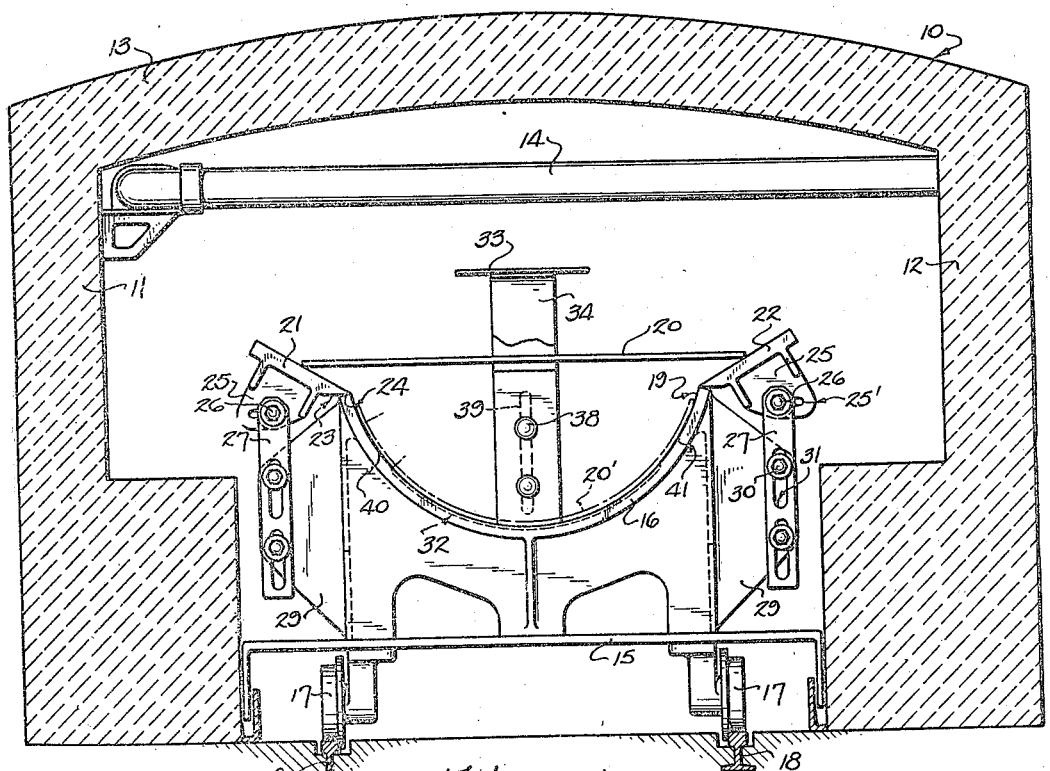
Fig. 1 is a vertical transverse section through a bending furnace showing the improved bending apparatus provided by the present invention in end elevation.
Figure 2:
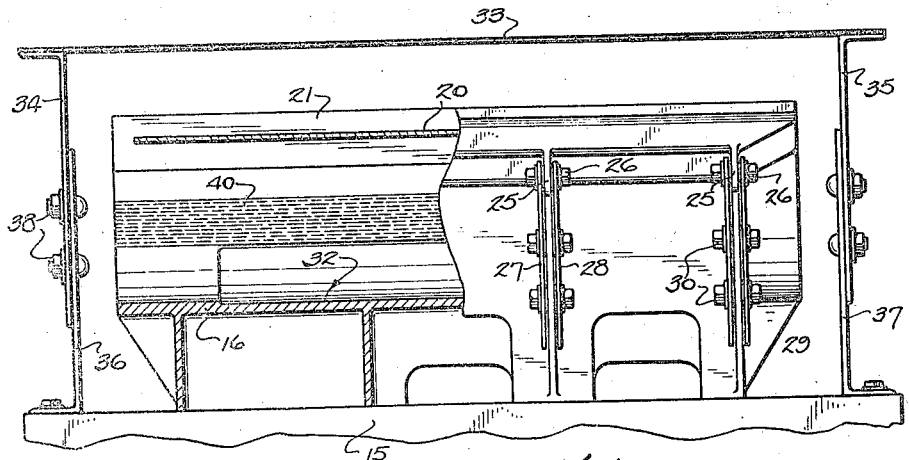
Fig. 2 is a side view of the bending apparatus, partially in section.
Figure 3:
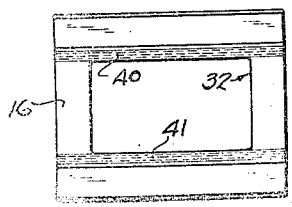
Fig. 3 is a plan view of the bending mold.

Referring now to the drawings and particularly to Fig. 1, the numeral 10 designates in its entirety a suitable bending furnace or oven which may or may not be of the continuous type. However, the furnace is preferably of tunnel-like formation and of considerable length so that the glass sheets to be bent may be introduced into one end thereof, carried therethrough and discharged from the opposite end. On the other hand, the sheets may be introduced into and removed from the same end of the furnace if desired. As shown, the furnace 10 comprises opposite vertical side walls 11 and 12 and an arch 13. The furnace may be heated in any desired manner, such as by radiant heating tubes 14 extending transversely of the furnace adjacent the arch 13.

The side walls 11 and 12 of bending furnace 10 define therebetween a way for the car or truck 15 carrying the concave bending mold 16, said car or truck being mounted upon wheels 17 rolling along rails 18 which extend longitudinally of the furnace. The upper surface 19 of bending mold 16 constitutes the shaping surface and is of a curvature corresponding to the curvature to be given the glass sheet.

The glass sheet 20 to be bent is supported horizontally above the mold 16, with the opposite side edges thereof resting upon inclined wing members 21 and 22 extending longitudinally of said mold. The bottom of each wing member 21 and 22 is beveled along its inner edge as at 23 and is adapted to engage the respective upper side edge 24 of the mold 16.

Each wing member 21 and 22 is provided adjacent its opposite ends and also intermediate its ends, if desired, with a plurality of attaching ears 25. Each of these ears is pivoted upon a bolt or the like 26 and is received between a pair of spaced vertical supporting strips 27 and 28, said strips being disposed at opposite sides of a vertical rib 29 formed at the side of the mold 16 and secured thereto by bolts or the like 30. The supporting strips 27 and 28 are provided with vertical slots 31 through which the bolts 30 pass and which permit bodily vertical adjustment of the wing members 21 and 22. The attaching ears 25 of wing members 21 and 22 are also formed with substantially horizontal slots 25' for receiving the bolts 26, whereby the said wing members may be adjusted horizontally.

Upon heating of the glass sheet 20 within the furnace, the glass becomes softened and settles downwardly into the mold 16 conforming to the curvature thereof as indicated at 20' (Fig. 1). Since the glass sheet before bending is always larger than the chord of the finished curve, the sides of the glass sheet always have to slip for a distance along the mold toward the center. By proper adjustment of the wing members 21 and 22, the glass sheet upon heating will be caused to slide freely therefrom and settle into the mold with a minimum amount of friction and with a minimum danger of impairment to the glass surface. It has also been found that in order to obtain optimum results the angle of inclination of the wing members 21 and 22 should be varied for sheets of different sizes and thicknesses. By providing the wing members 21 and 22, it is possible to cut down on the size of the mold where the girth is excessively larger than the chord. The wing members also make possible the bending of a 180° arc without scratching, lapping or prebending the glass sheet.

It is of course well known that when glass is at a sufficiently high temperature for permanent bending, its surface is easily injured by contact with any other body. To minimize the liability of marring of the glass surface upon settling thereof into the mold 16, the upper surface 19 of the mold is cut away to provide a shallow recess 32 and it is preferred that this recess be of a size equal to or slightly smaller than that of the finished bent sheet desired. In this way, those portions of the glass sheet which extend beyond the recess 32 may be trimmed off after the bending operation. As a result, no portion of the under surface of the finished bent sheet will contact the mold during the settling of the glass into said mold.

As pointed out above, it has heretofore been the usual practice in bending glass sheets in concave molds for a relatively greater amount of heat to be concentrated upon the central portion or area of the sheet than along the sides or marginal portions thereof. As a result of this ununiform heating, the central portion of the sheet settles into the mold first and then, as the temperature of the side portions is raised, the said side portions will also settle into the mold. However, in bending the sheet in this way, the sheet does not accurately conform to the curvature of the mold and, in fact, it is sometimes necessary that the side portions of the sheet be mechanically pressed or forced into the mold so that they will fit the same.

In accordance with the present invention, a more uniform heating of all portions of the glass sheet is achieved, with the result that a more uniform bending of the sheet is obtained. To this end, means is provided for shielding the central portion of the glass sheet from the radiant heat of the furnace and thereby retard the heating of said central portion, in combination with means for directing a greater amount of heat along the sides of the sheet to accelerate the bending thereof. In this way, the heating of the central portion of the glass sheet and the heating of the side portions thereof will be more nearly equalized so that all portions of the sheet will bend uniformly.

For the purpose of retarding the heating of the central portion of the glass sheet 20, there is mounted above the mold 16 a shield 33 which may be in the form of a horizontal plate extending longitudinally of the mold intermediate the opposite side edges thereof. The shield 33 may be supported in any desired manner such as by vertical end members 34 and 35 secured to vertical standards 36 and 37 on the mold car 15 by bolts or the like 38 which pass through slots 39 in said end members 34 and 35. In this way, the height of the shield 33 relative to the mold 16 may be varied as required, dependent upon the size and thickness of sheet to be bent.

To accelerate the heating of the side portions of the glass sheet 20, the upper surface 19 of mold 16 is provided along opposite sides thereof and adjacent its upper edges 24 with strips 40 and 41 of a relatively highly reflective material. That is to say, the strips 40 and 41 are of such character that they will reflect a greater amount of heat than the regular mold surface. These strips may be formed, for example, by painting with a relatively highly reflective paint, such as aluminum, gold, bronze, etc., or these particular portions of the mold surface may be plated with nickel, chrome, or other suitable metal. In other words, the strips 40 and 41 may be formed in any desired manner and be of any preferred material so long as the required relative rate of reflection between the strips and the rest of the mold surface is obtained. Thus, the strips 40 and 41 will absorb relatively less of the radiant heat passing through the glass sheet than would the natural dark surface of the mold and thereby act to reflect the heat back upon the glass sheet along the sides thereof.

By accelerating the heating of the side portions of the glass sheet 20 while simultaneously shielding the central portion thereof, the said sheet will be more uniformly heated throughout, as a result of which it will tend to settle uniformly into the mold, and will conform accurately to the curvature thereof. The width of the relatively highly reflective strips 40 and 41 as well as the position thereof upon the mold surface will be dependent upon the size and thickness of sheet as well as type of curve to which the sheet is to be bent.

The principle of retarding the heating of preselected portions of the glass sheet while simultaneously accelerating the heating of other portions thereof to obtain uniform bending of the sheet, as herein disclosed, may also be applied to convex molds or molds for bending regular and irregular shapes. In making certain types of bends, it may also be advantageous to omit the shield 33 and use only the highly reflective areas 40 and 41 on the mold to speed up the bending of the sheet at particular locations.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. A method of bending glass sheets upon a shaping surface by the action of heat and gravity, comprising directing heat sufficient to bend the glass substantially uniformly toward the entire sheet and at the same time shielding preselected portions only of the area of said sheet from said heat to retard the heating thereof while accelerating the heating of other preselected portions to promote uniform settling of the sheet onto the mold and cause it to accurately conform to the mold shape throughout the area of the sheet.

2. A method of bending glass sheets upon a horizontal concave mold by the action of heat and gravity, comprising directing heat sufficient to bend the glass substantially uniformly toward the entire sheet and at the same time shielding the central portion of said sheet from said heat to retard the heating thereof while accelerating the heating of the side portions to promote uniform settling of the sheet into the mold and cause it to accurately conform to the mold shape throughout the area of the sheet.

3. A method of bending glass sheets upon a horizontal concave mold by the action of heat and gravity, comprising heating the entire sheet and at the same time shielding the central portion of said sheet from the heat rays to retard the heating thereof while reflecting heat rays onto the side portions to promote uniform settling of the sheet into the mold and cause it to accurately conform to the mold shape throughout the area of the sheet.

4. In apparatus for bending glass sheets the combination with a bending mold for supporting a glass sheet to be bent and means for subjecting said sheet to radiant heat to effect a softening of the glass and settling of the sheet to take the shape of said mold, of a shielding body positioned above the mold and between it and the source of said radiant heat for retarding the passage of the heat rays to preselected portions of said sheet, and a heat reflecting surface beneath the sheet for reflecting certain of the heat rays back against the sheet.

5. In apparatus for bending glass sheets the combination with a bending mold for horizontally supporting a glass sheet to be bent and means for subjecting said sheet to radiant heat to effect a softening of the glass and settling of the sheet to take the shape of said mold, of a sheet of heat shielding material positioned above the mold for retarding the passage of heat rays to preselected portions of said sheet, and relatively highly reflective areas on the surface of said mold for reflecting heat rays back against the sheet.

6. In apparatus for bending glass sheets the combination with a bending mold for horizontally supporting a glass sheet to be bent and means for subjecting said sheet to radiant heat to effect a softening of the glass and settling of the sheet to take the shape of said mold, of a sheet of heat shielding material positioned above the mold for retarding the passage of heat rays to preselected portions of said sheet, and strips of a relatively highly reflective material applied to the surface of said mold for reflecting heat rays back against the sheet.

7. In apparatus for bending glass sheets the combination with a concave bending mold for horizontally supporting a glass sheet to be bent and means for subjecting said sheet to radiant heat to effect a softening of the glass and settling of the sheet to take the shape of said mold, of means positioned above the middle of the mold for shielding the middle of said sheet from the heat rays, and relatively highly reflective areas on the surface of said mold adjacent the sides thereof for reflecting heat rays back against the sheet.

8. In apparatus for bending glass sheets the combination with a concave bending mold for horizontally supporting a glass sheet to be bent and means for subjecting said sheet to radiant heat to effect a softening of the glass and settling of the sheet to take the shape of said mold, of a metal shield positioned above the middle of the mold for shielding the middle of said sheet from the heat rays, and strips of relatively highly reflective material applied to the upper surface of said mold adjacent the sides thereof for reflecting heat rays back against the sheet.

9. A mold for use in the bending of glass sheets by heat and gravity, comprising a metal shaping surface corresponding to the curvature to which the sheet is to be bent, said shaping surface having preselected areas thereon that are more highly reflective than the other areas thereof to control the settling of the sheet into the mold and cause it to accurately conform to the mold shape throughout the area of the sheet.

10. A mold for use in the bending of glass sheets by heat and gravity, comprising a concave metal shaping surface, and strips of a relatively highly reflective material on said shaping surface along the sides thereof.

11. A method of bending glass sheets on a mold by the action of heat and gravity, comprising applying heat sufficient to bend the glass to the entire sheet at the same time, retarding the application of said heat to preselected portions of the area of the sheet by shielding said portions from said heat, and accentuating the application of said heat to other preselected portions, to control the settling of the sheet into the mold and cause it to accurately conform to the mold shape throughout the entire area of the sheet.

ORMOND H. PADDOCK.
JOHN P. PEARSE.

REFERENCES CITED

The following references are of record in the file of this patent:

UNITED STATES PATENTS

| Number | Name | Date |
|---|---|---|
| 280,143 | De Voursney | June 26, 1883 |
| 760,959 | Commington | May 24, 1904 |
| 1,857,540 | Hardenberg | May 10, 1932 |
| 1,889,881 | Thompson | Dec. 6, 1932 |
| 1,999,558 | Black | Apr. 30, 1935 |
| 2,009,748 | Sherwood | July 30, 1935 |
| 2,176,999 | Miller | Oct. 24, 1939 |
| 2,213,406 | Paddock et al. | Sept. 3, 1940 |
| 2,215,228 | Oliver | Sept. 17, 1940 |
| 2,218,254 | Wengel | Oct. 15, 1940 |
| 2,244,715 | Long | June 10, 1941 |
| 2,314,812 | Blau et al. | Mar. 23, 1943 |
| 2,348,278 | Boyles et al. | May 9, 1944 |

FOREIGN PATENTS

| Number | Country | Date |
|---|---|---|
| 180,627 | Switzerland | Feb. 1, 1936 |
| 112,340 | Austria | Jan. 14, 1941 |